United States Patent
Yang et al.

(10) Patent No.: US 9,009,910 B2
(45) Date of Patent: Apr. 21, 2015

(54) WINDSHIELD WIPER WITH EVEN PRESSING FORCE

(76) Inventors: Chih-Ming Yang, Taipei (TW); Chuan-Chih Chang, Taipei (TW)

(*) Notice: Subject to any disclaimer, the term of this patent is extended or adjusted under 35 U.S.C. 154(b) by 535 days.

(21) Appl. No.: 13/282,391

(22) Filed: Oct. 26, 2011

(65) Prior Publication Data

US 2012/0311808 A1    Dec. 13, 2012

(30) Foreign Application Priority Data

Jun. 9, 2011    (CN) .................. 2011 2 0192467 U

(51) Int. Cl.
*B60S 1/32*    (2006.01)
*B60S 1/40*    (2006.01)
*B60S 1/38*    (2006.01)

(52) U.S. Cl.
CPC ........ *B60S 1/3801* (2013.01); *B60S 2001/3815* (2013.01); *B60S 2001/3813* (2013.01); *B60S 2001/3812* (2013.01); *B60S 1/381* (2013.01)

(58) Field of Classification Search
CPC .......... B60S 1/3801; B60S 2001/3812; B60S 2001/3813; B60S 2001/3815
USPC ............. 15/250.361, 250.44, 250.46, 250.32, 15/250.33
See application file for complete search history.

(56) References Cited

U.S. PATENT DOCUMENTS

| | | | | |
|---|---|---|---|---|
| 8,261,405 | B2 * | 9/2012 | Kim et al. .................. | 15/250.46 |
| 2007/0186366 | A1 * | 8/2007 | Alley ........................... | 15/250.4 |
| 2008/0196192 | A1 * | 8/2008 | Yao ............................. | 15/250.46 |

* cited by examiner

*Primary Examiner* — Mark Spisich
*Assistant Examiner* — Stephanie Berry
(74) *Attorney, Agent, or Firm* — Chun-Ming Shih; HDLS IPR Services

(57) ABSTRACT

A windshield wiper (1) with an even pressing force is connected to a driving arm (2) and includes a primary wiper frame (10), two auxiliary wiper frames (20), connecting frames (30), and a wiper blade (40). The primary wiper frame (10) includes a fixing base (11) connected to the driving arm (2). The auxiliary wiper frames (20) are disposed on both ends of the primary wiper frame (10). Each auxiliary wiper frame (20) includes an elastic piece (21) and a pivotal base (22) fixed to the elastic piece (21) and pivotally connected to the primary wiper frame (10). The connecting frames (30) are evenly provided on each auxiliary wiper frame (20). Each connecting frame (30) includes a pressing piece (31) and buckling brackets (32). The wiper blade (40) is disposed through the buckling brackets (32) to be connected below the pressing piece (31).

10 Claims, 7 Drawing Sheets

WINDSHIELD WIPER WITH EVEN PRESSING FORCE

BACKGROUND OF THE INVENTION

1. Field of the Invention

The present invention relates to a windshield wiper, and in particular to a windshield wiper mounted on a windshield of a car.

2. Description of Prior Art

Automotive windshield wiper is mounted on an outer surface of a windshield of a car. The windshield wiper is connected to a driving arm. The driving arm drives the windshield wiper to swing on the windshield.

The windshield wiper is used to wipe out rains, fogs or sludge on the windshield, so that the driver can have a good vision and an enhanced safety in driving. Thus, preferably, the windshield wiper is brought into compact contact with the outer surface of the windshield in such a manner that the windshield wiper exerts an even pressing force thereon. In this way, a wiper blade of the windshield wiper can be brought into compact contact with the windshield to wipe out the rains on the windshield completely.

In view of the above, the present inventor proposes a novel and reasonable structure on his expert knowledge and deliberate researches.

SUMMARY OF THE INVENTION

The present invention is to provide a windshield wiper with an even pressing force. The elastic pressing force of the windshield wiper is increased and evenly applied onto a windshield of a car, so that a wiper blade of the windshield can be brought into compact contact with the windshield.

The present invention is to provide a windshield wiper with an even pressing force, which is connected to a driving arm and includes a primary wiper frame, a pair of auxiliary wiper frames, a plurality of connecting frames, and a wiper blade. The primary wiper frame comprises a fixing base connected to the driving arm. The pair of auxiliary wiper frames is disposed on both ends of the primary wiper frame respectively. Each of the auxiliary wiper frames comprises an elastic piece and a pivotal base fixed to the elastic piece. The pivotal base is pivotally connected to the primary wiper frame. The connecting frames are evenly provided on each of the auxiliary wiper frames. Each of the connecting frames comprises a pressing piece and a plurality of buckling brackets provided on the pressing piece. The wiper blade is disposed through the buckling brackets to be connected below the pressing piece.

In comparison with prior art, the present invention has advantageous features as follows. A pair of auxiliary wiper frames is disposed on both ends of the primary wiper frame. A plurality of connecting frames is evenly disposed on each of the auxiliary wiper frames. Finally, the wiper blade is connected to the connecting frame. By this arrangement, when the driving arm drives the primary wiper frame to swing and exerts a pressing force on the primary wiper frame, the connecting frame evens the pressing force on the wiper blade. Further, the elastic force of the pair of auxiliary wiper frames and the connecting frames makes the wiper blade to be brought into compact contact with the windshield, thereby generating an excellent wiping effect.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
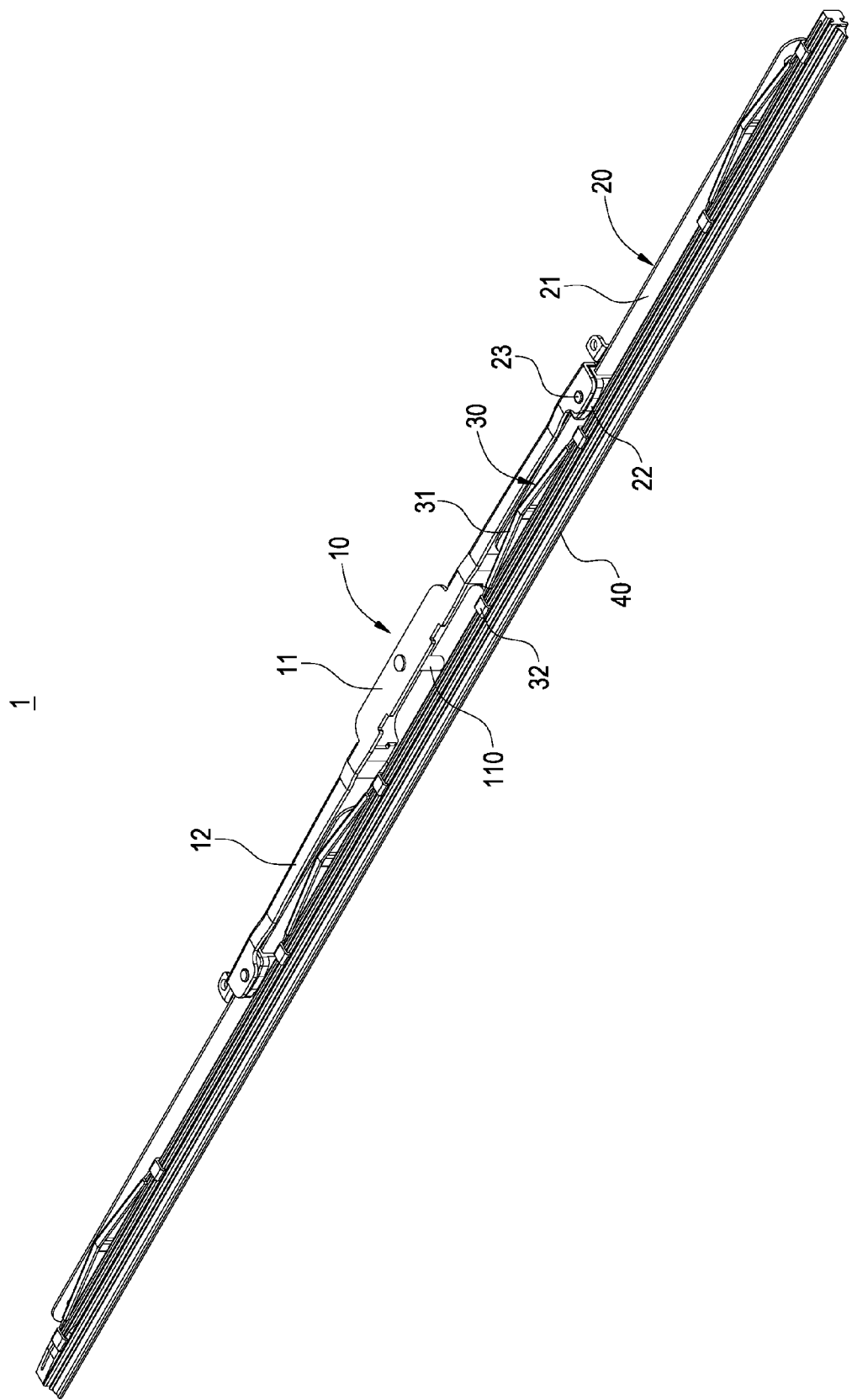
FIG. 1 is a perspective view showing the external appearance of the windshield wiper of the present invention.
Figure 2:
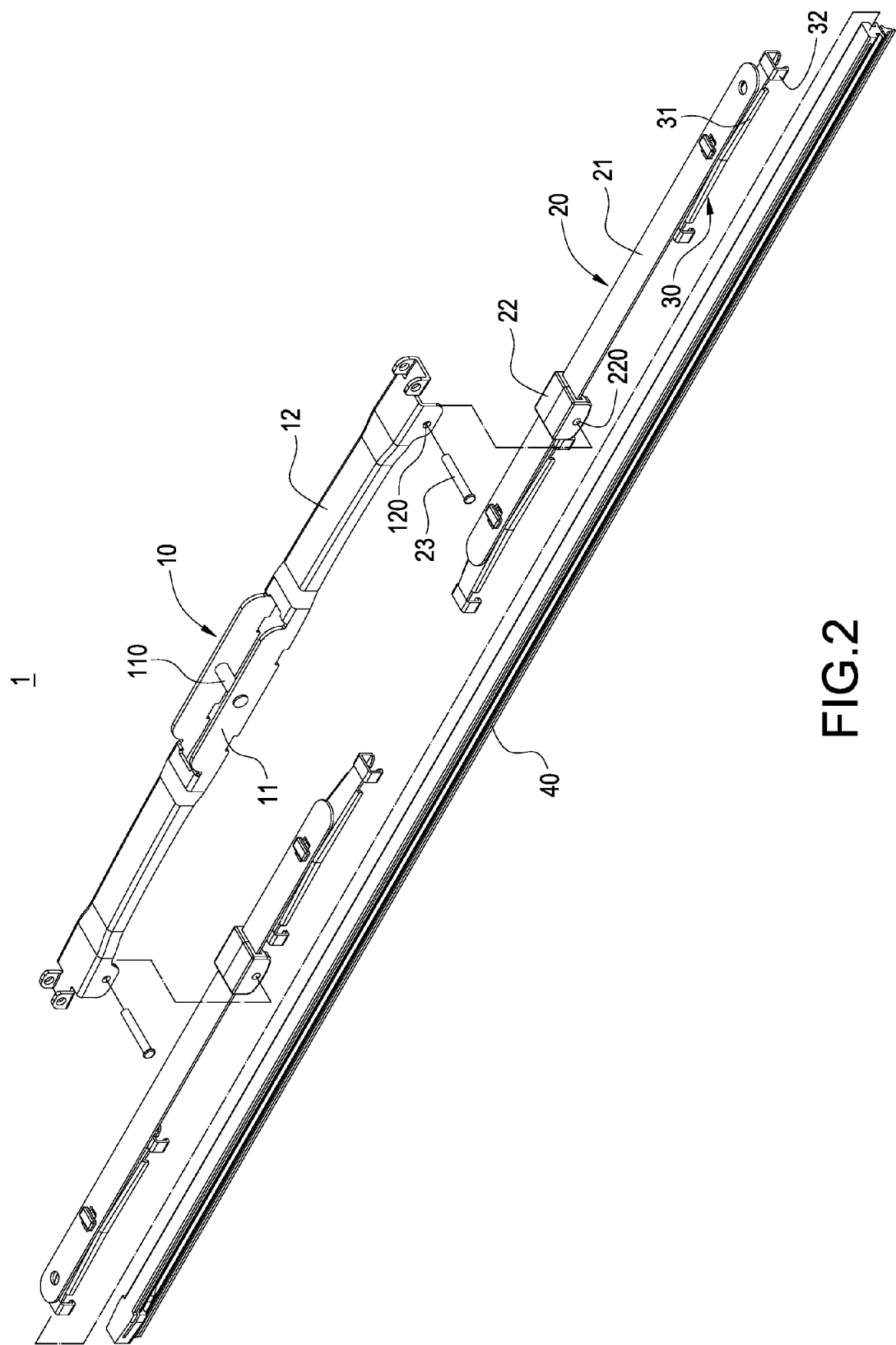
FIG. 2 is an exploded perspective view showing the windshield wiper of the present invention.

Please refer to FIG. 1 and FIG. 2. FIG. 1 is a perspective view showing the external appearance of the windshield wiper of the present invention, and FIG. 2 is an exploded perspective view showing the windshield wiper of the present invention. The present invention provides a windshield wiper with an even pressing force, which includes a primary wiper frame 10, a pair of auxiliary wiper frames 20, a plurality of connecting frames 30, and a wiper blade 40.

The primary wiper frame 10 comprises a fixing base 11. The fixing base 11 has a pivotal shaft 110. In the present embodiment, the primary wiper frame 10 further includes a set of fixing arms 12 connected to both sides of the fixing base 11. Each fixing arm 12 is provided with a first pivotal hole 120.

The pair of auxiliary wiper frames 20 is provided on both ends of the primary wiper frame 10, respectively. Each of the auxiliary wiper frames 20 comprises an elastic piece 21, a pivotal base 22 fixed to the elastic piece 21, and a set of rods 23. The elastic piece 21 is made by metallic materials and has elasticity for deformation. The pivotal base 22 is pivotally connected to the primary wiper frame 10. In the present embodiment, the pivotal base 22 is connected to the fixing arm 12. Each rod 23 is disposed through the pivotal base 22 and the fixing arm 12, so that the pair of auxiliary wiper frames 20 can be connected to the fixing arms 12. In the present embodiment, the pivotal base 22 is provided with a second pivotal hole 220 corresponding to the first pivotal hole 120. The rod 23 is disposed through the first pivotal hole 120 and the second pivotal hole 220, thereby connecting the pair of auxiliary wiper frames 20 to the fixing arms 12.

The connecting frames 30 are evenly disposed on each auxiliary wiper frame 20. Each of the auxiliary wiper frames 20 is provided with the same number of connecting frames 30. In the present embodiment, each of the auxiliary wiper frames 20 is provided with two connecting frames 30 (not limited thereto). The two connecting frames 30 are provided on both ends of the auxiliary wiper frame 20 respectively. Each of the connecting frames 30 comprises a pressing piece 31 and a plurality of buckling brackets 32 provided on the pressing piece 31. The wiper blade 40 is made of rubber. The wiper blade 40 is disposed through the buckling brackets 32 and connected below the pressing pieces 31.

Figure 3:
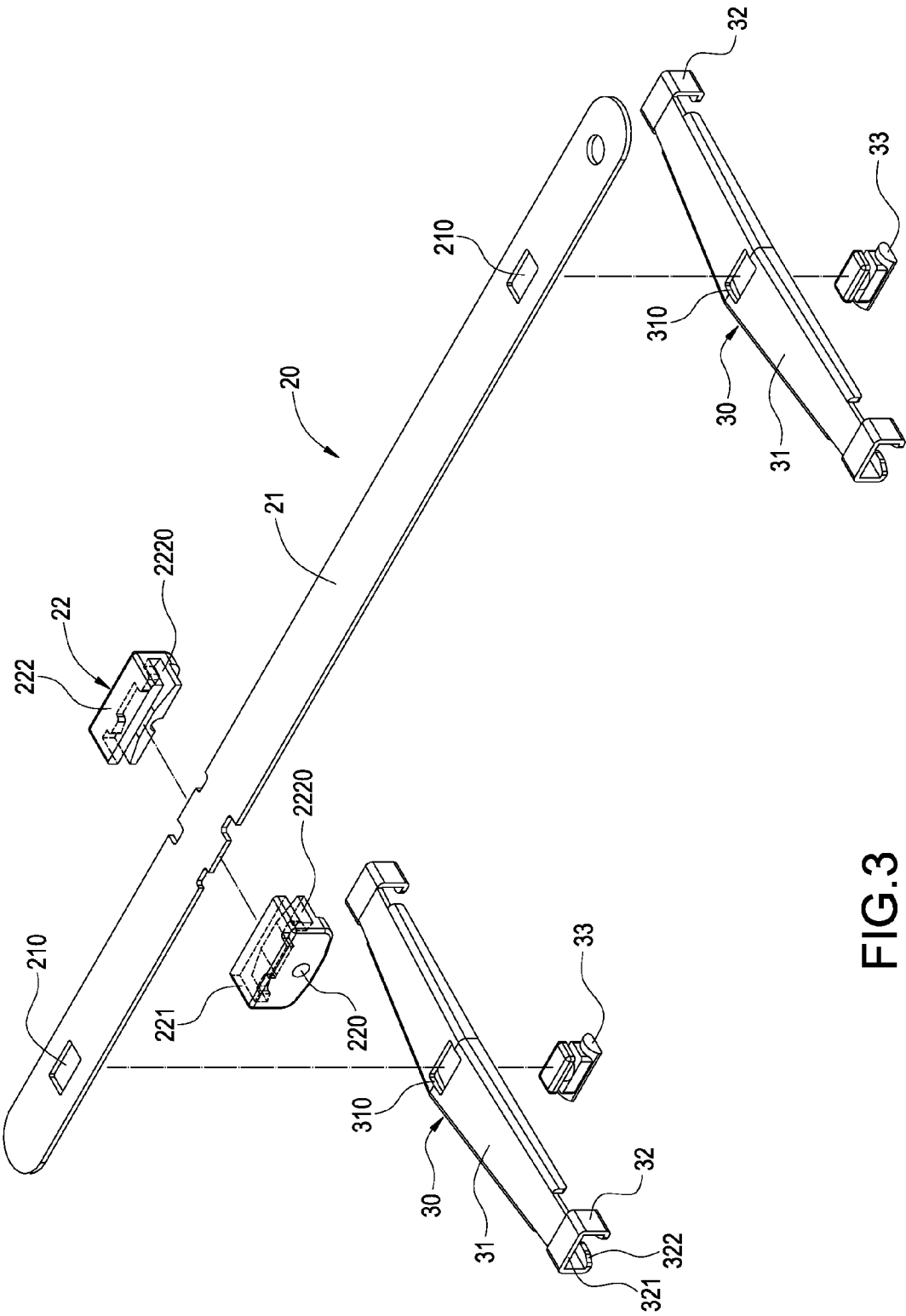
FIG. 3 is an exploded perspective view showing the auxiliary wiper frames and the connecting frames of the present invention.
Figure 4:
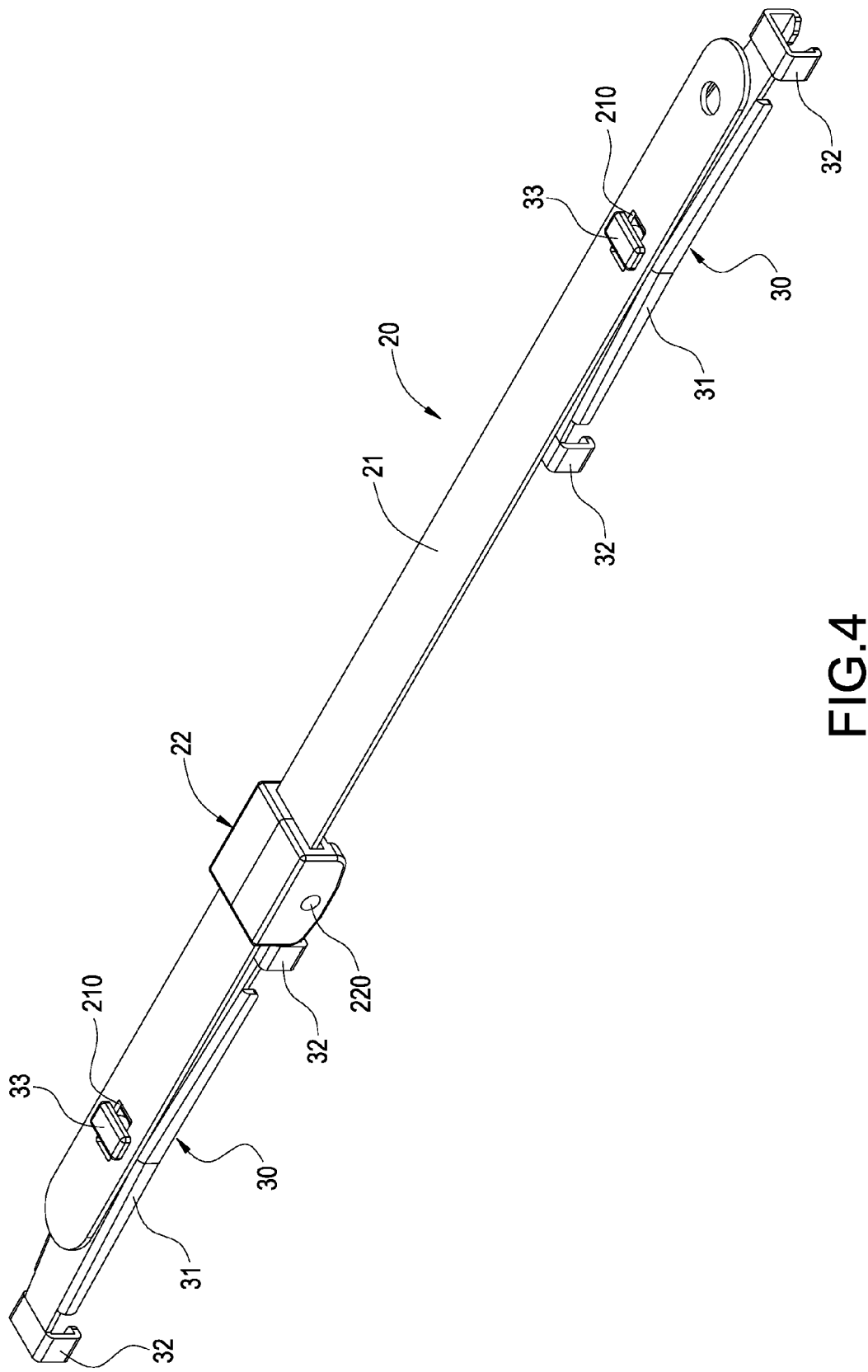
FIG. 4 is a perspective view showing the external appearance when the auxiliary wiper frames and the connecting frames of the present invention are assembled together.
Figure 5:
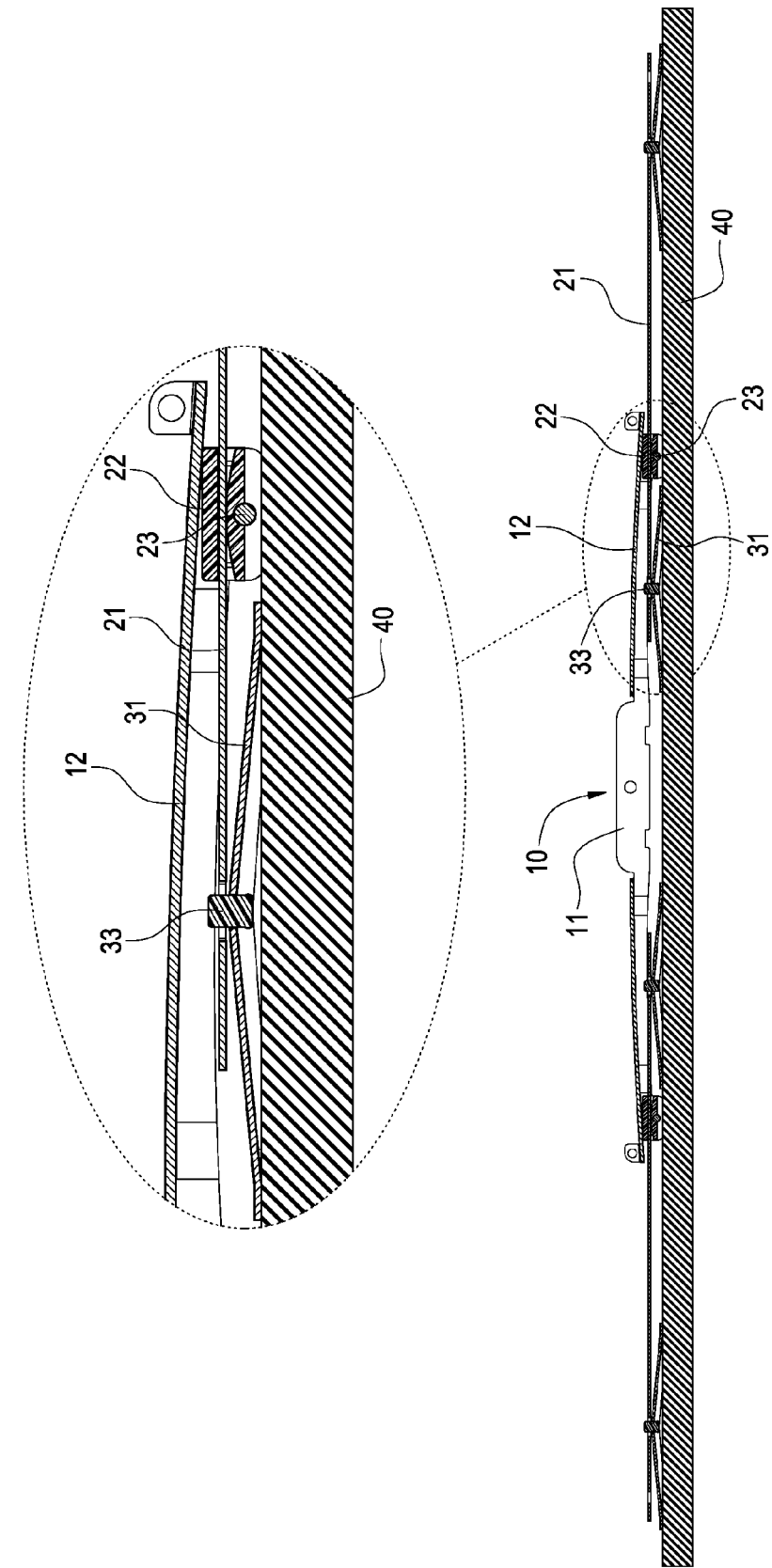
FIG. 5 is an assembled cross-sectional view showing the windshield wiper of the present invention.
Figure 6:
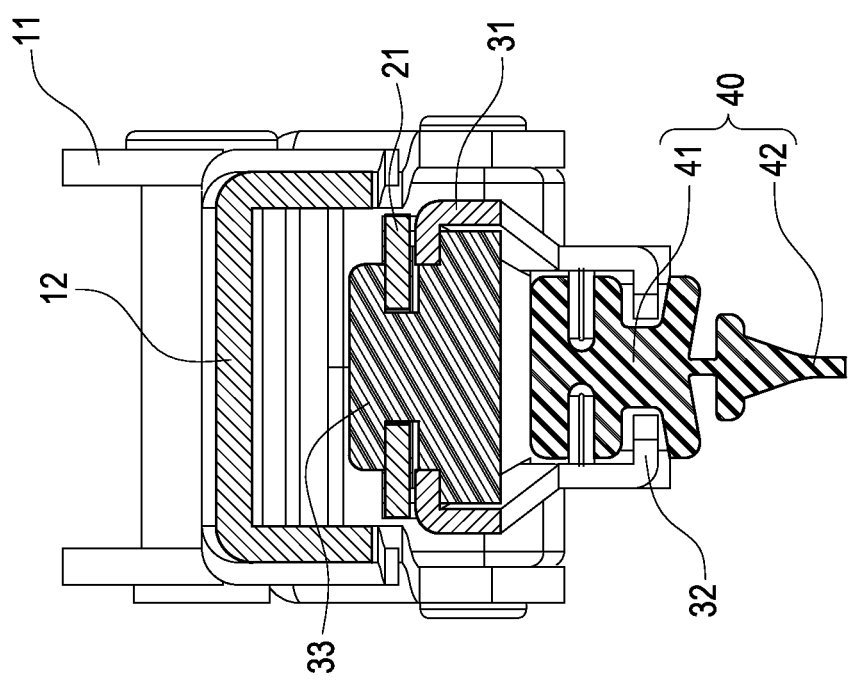
FIG. 6 is another assembled cross-sectional view showing the windshield wiper of the present invention.

Please refer to FIGS. 3 to 6. FIG. 3 is an exploded perspective view showing the auxiliary wiper frames and the connecting frames of the present invention. FIG. 4 is a perspective view showing the external appearance when the auxiliary wiper frames and the connecting frames of the present invention are assembled together. FIG. 5 is an assembled cross-sectional view showing the windshield wiper of the present invention. FIG. 6 is another assembled cross-sectional view showing the windshield wiper of the present invention. The pivotal base 22 of the auxiliary wiper frame 20 comprises a first connecting base 221 and a second connecting base 222 connected to both sides of the elastic piece 21. The first connecting base 221 and the second connecting base 222 are provided with a second pivotal hole 220 respectively for allowing the rod 23 to pass through. The first connecting base 221 is provided with a first through-hole 2210, and the second connecting base 222 is provided with a second trough 2220. The first connecting base 221 and the second connecting base 222 are positioned on both sides of the elastic piece 21 by means of the first through-hole 2210 and the second through-hole 2220. Then, the rod 23 is disposed into the second pivotal hole 220, so that the pivotal base 22 can be pivotally connected to the bottom surface of the fixing arm 12.

The assembly of the connecting frame 30 will be described more specifically as follows. The pressing piece 31 is formed into an arc shape, so that the middle portion of the pressing piece 31 is positioned at a level higher that of both sides of the pressing piece 31. The buckling bracket 32 comprises a U-shaped frame 321 and a set of restricting pieces 322 formed inside the U-shaped frame 321. The wiper blade 40 is slidingly connected to the inside of the restricting piece 322. The wiper blade 40 comprises a fixing section 41 and a wiping section 42 connected to the fixing section 41. The fixing section 41 is disposed through the U-shaped frame 321 along the restricting pieces 322. The wiping piece 42 is exposed to the outside of the U-shaped frame 321, thereby connecting the wiping blade 40 to the connecting frames 30.

Further, the connecting frame 30 comprises a plurality of positioning blocks 33. The elastic piece 21 is provided with a plurality of first troughs 210. Each of the pressing pieces 31 is provided with a second trough 310. The positioning block 33 is disposed through the second trough 310 to abut in the first trough 210, thereby fixing the connecting frame 30 to the bottom surface of the elastic piece 21.

Figure 7:
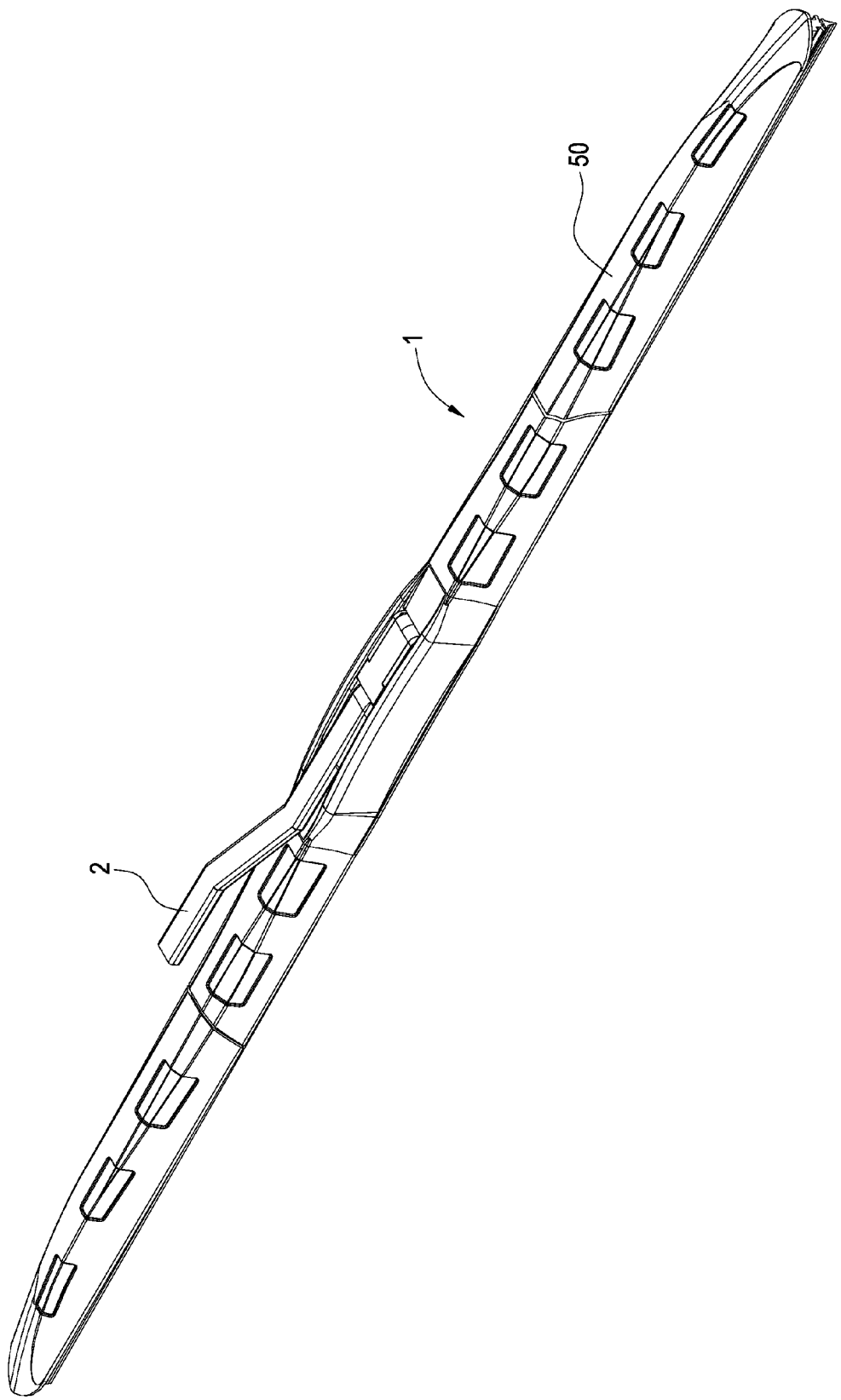
FIG. 7 is a schematic view showing the application of the windshield wiper of the present invention.

Please refer to FIG. 7, which is a schematic view showing the application of the windshield wiper of the present invention. The wiper blade 1 is connected to a driving arm 2. The driving arm 2 is fixed to the pivotal shaft 110 of the primary wiper frame 10, so that the driving arm 2 can drive the windshield wiper 1. Further, a protective sheath 50 is put outside the windshield wiper 1 for protection purpose.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A windshield wiper (1) with an even pressing force, connected to a driving arm (2) and including:
    a primary wiper frame (10) comprising a fixing base (11) connected to the driving arm (2);
    a pair of auxiliary wiper frames (20) provided on both ends of the primary wiper frame (10), each of the auxiliary wiper frames (20) comprising an elastic piece (21) and a pivotal base (22) fixed to the elastic piece (21), the pivotal base (22) being pivotally connected to the primary wiper frame (10),
    wherein the elastic piece (21) is formed as a single unitary piece;
    a pair of connecting frames (30) evenly provided on each of the elastic pieces (21), each of the connecting frames (30) comprising a pressing piece (31) and a plurality of buckling brackets (32) provided on the pressing piece (31); and
    a wiper blade (40) disposed through the buckling brackets (32) to be connected below the pressing piece (31),
    wherein the connecting frame (30) further comprises a plurality of positioning blocks (33), the elastic piece (21) is provided with a plurality of first troughs (210), each of the pressing pieces (31) is provided with a second trough (310), and the positioning block (33) is disposed through the second trough (310) and the first trough (210), and configured to fix the connecting frame (30) to the elastic piece (21) by rotating from a first orientation to a second orientation with respect to the elastic piece (21), the second orientation being different from the first orientation.

2. The windshield wiper with an even pressing force according to claim 1, wherein the fixing base (11) has a pivotal shaft (110), and the pivotal shaft (110) is connected to the driving arm (2).

3. The windshield wiper with an even pressing force according to claim 1, wherein the primary wiper frame (10) further comprises a set of fixing arms (12) connected to both sides of the fixing base (11) respectively, and the pivotal base (22) is connected to the fixing arm (12).

4. The windshield wiper with an even pressing force according to claim 3, wherein the auxiliary wiper frame (20) further comprises a set of rods (23), and each rod (23) is disposed through the pivotal base (22) and the fixing arm (12), thereby connecting the pair of auxiliary wiper frames (20) to the fixing arms (12).

5. The windshield wiper with an even pressing force according to claim 4, wherein the fixing arm (12) is provided with a first pivotal hole (120), the pivotal base (22) is provided with a second pivotal hole (220), the rod (23) is disposed through the first pivotal hole (120) and the second pivotal hole (220).

6. The windshield wiper with an even pressing force according to claim 1, wherein the pressing piece (31) is formed into an arc shape, and a middle portion of the pressing piece (31) is located at a level higher than that of both sides of the pressing piece (31).

7. The windshield wiper with an even pressing force according to claim 1, wherein the buckling bracket (32) comprises a U-shaped frame (321) and a set of restricting pieces (322) formed inside the U-shaped frame (321), and the wiper blade (40) is slidingly connected to the inside of the set of the restricting pieces (322).

8. The windshield wiper with an even pressing force according to claim 7, wherein the wiper blade (40) comprises a fixing section (41) and a wiping section (42) connected to the fixing section (41), the fixing section (41) is disposed through the U-shaped frame (321) along the set of restricting pieces (322), and the wiping section (42) is exposed to the outside of the U-shaped frame (321).

9. A windshield wiper (1) with an even pressing force, connected to a driving arm (2) and including:
    a primary wiper frame (10) comprising a fixing base (11) connected to the driving arm (2);

a pair of auxiliary wiper frames (20) provided on both ends of the primary wiper frame (10), each of the auxiliary wiper frames (20) comprising an elastic piece (21) and a pivotal base (22) fixed to the elastic piece (21), the pivotal base (22) being pivotally connected to the primary wiper frame (10);

a plurality of connecting frames (30) evenly provided on each of the auxiliary wiper frames (20), each of the connecting frames (30) comprising a pressing piece (31) and a plurality of buckling brackets (32) provided on the pressing piece (31); and a wiper blade (40) disposed through the buckling brackets (32) to be connected below the pressing piece (31), wherein the primary wiper frame (10) further comprises a set of fixing arms (12) connected to both sides of the fixing base (11) respectively, and the pivotal base (22) is connected to the fixing arm (12), wherein the auxiliary wiper frame (20) further comprises a set of rods (23), and each rod (23) is disposed through the pivotal base (22) and the fixing arm (12), thereby connecting the pair of auxiliary wiper frames (20) to the fixing arms (12), and wherein the pivotal base (22) comprises a first connecting base (221) and a second connecting base (222) connected to both sides of the elastic piece (21) respectively, and the first connecting base (221) and the second connecting base (222) are respectively provided with a second pivotal hole (220) for allowing the rod (23) to be disposed through.

10. The windshield wiper with an even pressing force according to claim 9, wherein the first connecting base (221) is provided with a first through-hole (2210), the second connecting base (222) is provided with a second through-hole (2220), and the first connecting base (221) and the second connecting base (222) are positioned on both sides of the elastic piece (21) by means of the first through-hole (2210) and the second through-hole (2220).

* * * * *